US00RE40814E

(19) United States
(12) Reissued Patent
Van Brunt et al.

(10) Patent Number: US RE40,814 E
(45) Date of Reissued Patent: Jun. 30, 2009

(54) OSCILLATORY CHEST COMPRESSION DEVICE

(75) Inventors: Nicholas P. Van Brunt, White Bear Lake, MN (US); Donald J. Gagne, St. Paul, MN (US)

(73) Assignee: Hill-Rom Services, Inc., Wilmington, DE (US)

(21) Appl. No.: 10/055,849

(22) Filed: Jan. 14, 2002

Related U.S. Patent Documents

Reissue of:
(64) Patent No.: 6,036,662
Issued: Mar. 14, 2000
Appl. No.: 09/039,606
Filed: Mar. 16, 1998

U.S. Applications:
(63) Continuation of application No. 08/661,931, filed on Jun. 11, 1996, now Pat. No. 5,769,797.

(51) Int. Cl.
*A61H 31/00* (2006.01)

(52) U.S. Cl. ..... 601/41; 601/44; 601/152; 601/DIG. 7; 601/DIG. 11

(58) Field of Classification Search ..... 601/41–44, 601/48, 55, 56, 77, 148–152; 128/DIG. 20; 602/13
See application file for complete search history.

(56) References Cited

U.S. PATENT DOCUMENTS

| | | | |
|---|---|---|---|
| 402,779 | A | 5/1889 | Steinhoff |
| 1,898,652 | A | 2/1933 | Williams |
| 2,223,570 | A | 12/1940 | McMillin |
| 2,263,844 | A | 11/1941 | Hammond |
| 2,354,397 | A | 7/1944 | Miller |
| 2,436,853 | A | 3/1948 | Coleman |
| 2,486,667 | A | 11/1949 | Meister |
| 2,529,258 | A | 11/1950 | Lobo |
| 2,543,284 | A | 2/1951 | Gleason |
| 2,588,192 | A | 3/1952 | Akerman et al. |
| 2,626,601 | A | 1/1953 | Riley |
| 2,762,200 | A | 9/1956 | Huxley, III |
| 2,762,366 | A | 9/1956 | Huxley, III et al. |
| 2,762,700 | A | 9/1956 | Brooks |
| 2,772,673 | A | 12/1956 | Huxley, III |
| 2,779,329 | A | 1/1957 | Huxley, III et al. |
| 2,780,222 | A | 2/1957 | Polzin et al. |
| 2,818,853 | A | 1/1958 | Huxley, III et al. |
| 2,832,335 | A | 4/1958 | Huxley, III et al. |

(Continued)

FOREIGN PATENT DOCUMENTS

| | | | |
|---|---|---|---|
| CA | 1225889 | | 8/1987 |
| EP | 0542383 | A2 | 5/1993 |
| FR | 2556213 | | 6/1985 |
| GB | 616173 | | 1/1949 |
| JP | 61-244884 | | 10/1986 |
| SE | 105158 | | 8/1942 |
| SE | 143165 | | 12/1953 |
| SU | 1247-009 | A1 | 8/1987 |
| WO | WO 02/06673 | A1 | 1/2002 |

OTHER PUBLICATIONS

G.J. Beck, "Chronic Bronchial Asthma and Emphysema: Rehabilitation and Use of Thoracic Vibrocompression," *Geriatrics*, pp. 139–158 (Jun. 1966).

(Continued)

*Primary Examiner*—Danton DeMille
(74) *Attorney, Agent, or Firm*—Barnes & Thornburg LLP

(57) ABSTRACT

An oscillatory chest compression device includes an oscillatory air flow generator and a positive air flow generator. A first feedback system controls the oscillation rate of the oscillatory air flow generator, and a second feedback system controls the peak pressure created by the positive air flow generator.

118 Claims, 3 Drawing Sheets

U.S. PATENT DOCUMENTS

| | | | | |
|---|---|---|---|---|
| 2,869,537 | A | | 1/1959 | Chu |
| 2,899,955 | A | | 8/1959 | Huxley, III et al. |
| 2,918,917 | A | | 12/1959 | Emerson |
| 3,029,743 | A | | 4/1962 | Johns |
| 3,043,292 | A | | 7/1962 | Mendelson |
| 3,063,444 | A | | 11/1962 | Jobst |
| 3,078,842 | A | | 2/1963 | Gray |
| 3,120,228 | A | | 2/1964 | Huxley, III |
| 3,179,106 | A | | 4/1965 | Meredith |
| 3,184,672 | A | | 5/1965 | Mason et al. |
| 3,288,132 | A | | 11/1966 | Meredith |
| 3,307,533 | A | | 3/1967 | Meredith et al. |
| 3,310,050 | A | | 3/1967 | Goldfarb |
| 3,327,195 | A | | 6/1967 | Mason |
| 3,333,581 | A | | 8/1967 | Robinson et al. |
| 3,441,826 | A | | 4/1969 | Mason |
| 3,447,055 | A | | 5/1969 | Mason |
| 3,481,327 | A | | 12/1969 | Drennen |
| 3,507,297 | A | | 4/1970 | Dann |
| 3,536,063 | A | | 10/1970 | Werding |
| 3,566,862 | A | | 3/1971 | Schuh et al. |
| 3,577,077 | A | | 5/1971 | Ritzinger, Jr. et al. |
| 3,601,673 | A | | 8/1971 | Mason |
| 3,604,415 | A | | 9/1971 | Hoenig |
| 3,634,874 | A | | 1/1972 | Mason |
| 3,669,108 | A | | 6/1972 | Sundblom et al. |
| 3,672,354 | A | | 6/1972 | Weber |
| 3,678,360 | A | | 7/1972 | Minarik et al. |
| 3,683,655 | A | | 8/1972 | White et al. |
| 3,760,801 | A | | 9/1973 | Boreas |
| 3,783,361 | A | | 1/1974 | Mason |
| 3,802,417 | A | | 4/1974 | Lang |
| 3,849,710 | A | | 11/1974 | Mason |
| 3,878,839 | A | * | 4/1975 | Norton et al. |
| 3,885,554 | A | | 5/1975 | Rockwell, Jr. |
| 3,896,794 | A | | 7/1975 | McGrath |
| 3,910,270 | A | | 10/1975 | Stewart |
| 3,993,053 | A | | 11/1976 | Grossan |
| 4,003,377 | A | | 1/1977 | Dahl |
| 4,020,834 | A | | 5/1977 | Bird |
| 4,079,733 | A | | 3/1978 | Denton et al. |
| 4,120,297 | A | | 10/1978 | Rabischong et al. |
| 4,133,305 | A | | 1/1979 | Steuer |
| 4,135,503 | A | | 1/1979 | Romano |
| 4,175,297 | A | | 11/1979 | Robbins et al. |
| 4,178,922 | A | | 12/1979 | Curlee |
| 4,186,732 | A | | 2/1980 | Christoffel |
| 4,239,039 | A | | 12/1980 | Thompson |
| 4,257,407 | A | | 3/1981 | Macchi |
| 4,296,743 | A | | 10/1981 | Lasley |
| 4,311,135 | A | | 1/1982 | Brueckner et al. |
| 4,323,064 | A | | 4/1982 | Hoenig et al. |
| 4,349,015 | A | | 9/1982 | Alferness |
| 4,397,306 | A | | 8/1983 | Weisfeldt et al. |
| 4,398,531 | A | | 8/1983 | Havstad |
| 4,424,806 | A | | 1/1984 | Newman et al. |
| 4,429,688 | A | | 2/1984 | Duffy |
| 4,453,538 | A | | 6/1984 | Whitney |
| 4,481,944 | A | | 11/1984 | Bunnell |
| 4,523,579 | A | | 6/1985 | Barry |
| 4,538,604 | A | | 9/1985 | Usry et al. |
| 4,546,764 | A | | 10/1985 | Gerber |
| 4,577,626 | A | | 3/1986 | Marukawa et al. |
| 4,578,833 | A | | 4/1986 | Vrzalik |
| 4,590,925 | A | | 5/1986 | Dillon |
| 4,621,621 | A | | 11/1986 | Marsalis |
| 4,676,232 | A | | 6/1987 | Olsson et al. |
| 4,682,588 | A | | 7/1987 | Curlee |
| 4,753,226 | A | | 6/1988 | Zheng et al. |
| 4,770,165 | A | | 9/1988 | Hayek |
| 4,805,612 | A | | 2/1989 | Jensen |
| 4,815,452 | A | | 3/1989 | Hayek |
| 4,838,263 | A | | 6/1989 | Warwick et al. |
| 4,840,167 | A | | 6/1989 | Olsson et al. |
| 4,928,674 | A | | 5/1990 | Halperin et al. |
| 4,930,498 | A | | 6/1990 | Hayek |
| 4,971,042 | A | | 11/1990 | Lerman |
| 4,977,889 | A | | 12/1990 | Budd |
| 4,982,735 | A | | 1/1991 | Yagata et al. |
| 5,000,164 | A | | 3/1991 | Cooper |
| 5,042,470 | A | | 8/1991 | Kanesaka |
| 5,056,505 | A | | 10/1991 | Warwick et al. |
| 5,076,259 | A | | 12/1991 | Hayek |
| 5,101,808 | A | | 4/1992 | Kobayashi et al. |
| 5,188,097 | A | | 2/1993 | Hansen |
| 5,222,478 | A | | 6/1993 | Scarberry et al. |
| 5,235,967 | A | | 8/1993 | Arbisi et al. |
| 5,245,990 | A | | 9/1993 | Bertinin |
| 5,261,394 | A | | 11/1993 | Mulligan et al. |
| 5,269,659 | A | | 12/1993 | Hampton et al. |
| 5,277,194 | A | | 1/1994 | Hosterman et al. |
| 5,299,599 | A | | 4/1994 | Farmer et al. |
| 5,343,878 | A | | 9/1994 | Scarberry et al. |
| 5,370,603 | A | | 12/1994 | Newman |
| 5,378,122 | A | | 1/1995 | Duncan |
| 5,437,615 | A | | 8/1995 | Pekar et al. |
| 5,453,081 | A | | 9/1995 | Hansen |
| 5,490,820 | A | | 2/1996 | Schock et al. |
| 5,496,262 | A | | 3/1996 | Johnson, Jr. et al. |
| 5,497,766 | A | | 3/1996 | Foster et al. |
| 5,562,604 | A | | 10/1996 | Yablon et al. |
| 5,569,122 | A | | 10/1996 | Cegla |
| 5,569,170 | A | | 10/1996 | Hansen |
| 5,573,498 | A | | 11/1996 | Hayek |
| 5,575,762 | A | | 11/1996 | Peeler et al. |
| 5,592,938 | A | | 1/1997 | Scarberry et al. |
| 5,606,754 | A | | 3/1997 | Hand et al. |
| 5,674,269 | A | | 10/1997 | Augustine |
| 5,720,709 | A | | 2/1998 | Schnall |
| 5,738,637 | A | | 4/1998 | Kelly et al. |
| 5,769,797 | A | | 6/1998 | Van Brunt et al. |
| 5,769,800 | A | | 6/1998 | Gelfand et al. |
| 5,806,512 | A | | 9/1998 | Abramov et al. |
| 5,836,751 | A | | 11/1998 | De Villiers |
| 5,840,049 | A | | 11/1998 | Tumey et al. |
| 5,891,062 | A | | 4/1999 | Schock et al. |
| 6,254,556 | B1 | | 7/2001 | Hansen et al. |

OTHER PUBLICATIONS

M. King et al., "Enhanced Tracheal Mucus Clearance with High Frequency Chest Wall Compression," *Am. Rev. Respir. Dis.* 128:511–515 (1983).

D. Gross et al., "Peripheral Mucociliary Clearance with High–Frequency Chest Wall Compression," *J. Appl. Physiol.* 58: 1157–1163 (1985).

E.L. De Weese et al., "Ventilatory Response to High Frequency Airway Oscillation in Humans," *J. Appl. Physiol.* 58: 1099–1106 (1985).

A. Harf et al., "Nitrogen Washout During Tidal Breathing with Superimposed High–Frequency Chest Wall Oscillation," *Am. Rev. Respir. Dis.* 132: 350–353 (1985).

P.M.A. Calverley et al., "High Frequency Chest Wall Oscillation: Assistance to Ventillation in Spontaneously Breathing Subjects," *Chest* 89: 218–223 (1986).

J. Piquet et al., "High Frequency Chest Wall Oscillation in Patients with Chronic Air–Flow Obstruction," *Am. Rev. Respir. Dis.* 136: 1355–1359 (1987).

H.K. Chang et al., "Mucus Transport by High–Frequency Nonsymmetrical Oscillatory Airflow," *J. Appl. Physiol.* 65: 1203–1209 (1988).
E.M. Rubin et al., "Effect of Chest Wall Oscillation on Mucus Clearance: Comparison of Two Vibrators," *Pediatric Pulmonol.* 6: 122–126 (1989).
M. King et al., "Tracheal Mucus Clearance in High–Frequency Oscillation: Effect of Peak Flow Rate Bias," *Eur. Respir. J.* 3: 6–13 (1990).
L.G. Hansen & W.J. Warwick, "High–Frequency Chest Compression System to Aid in Clearance of Mucus from the Lung," *Biomed. Instrument & Technol.* 24: 289–294 (1990).
W.J. Warwick & L.G. Hansen, "The Long Term Effect of High–Frequency Chest Compression Therapy on Pulmonary Complications of Cystic Fibrosis," *Pediatric Pulmonol.* 11: 265–271 (1991).
"AARC Clinical Practice Guideline: Postural Drainage Therapy," *Respir. Care* 36: 1418–1426 (1991).
W.J. Warwick, "Airway Clearance by High Frequency Chest Compression," *Pediatric Pulmonol.* Suppl. 8: 138–139 (1992).
C. Robinson & L. Hernried, "Evaluation of a High Frequency Chest Compression Device in Cystic Fibrosis," *Pediatric Pulmonol.* Suppl. 8: 304 (1992).
M. Burnett et al., "Comparative Efficacy of Manual Chest Physiotherapy and a High Frequency Chest Compression Vest in Inpatient Treatment of Cystic Fibrosis," *Am. Rev. Respir. Dis.* 147: A30 (1993).
J. Whitman et al., "Preliminary Evaluation of High–Frequency Chest Compression for Secretion Clearance in Mechanically Ventilated Patients," *Respir. Care* 38: 1081–1087 (1993).
R. Arens et al., "Comparison of High Frequency Chest Compression and Conventional Chest Physiotherapy in Hospitalized Patients with Cystic Fibrosis," *Am. J. Respir. Crit. Care Med.* 150: 1154–1157 (1994).
R.P. Tomkiewicz et al., "Effects of Oscillating Air Flow on the Rheological Properties and Clearabilit of Mucous Gel Simulants," *Biorheology* 31: 511–520 (1994).
C. Braggion et al., "Short–Term Effects of Three Chest Physiotherapy Regimens in Patients Hospitalized for Pulmonary Exacerbations of Cystic Fibrosis: A Cross–Over Randomized Study," *Pediatric Pulmonol.* 19: 16–22 (1995).
R.L. Jones et al., "Effects of High Frequency Chest Compression on Respiratory System Mechanics in Normal Subjects and Cystic Fibrosis Patients," *Can. Respir. J.* 2: 40–46 (1995).
B. Dasgupta et al., "Effects of Combined Treatment with rHDNase and Airflow Oscillations on Spinnability of Cystic Fibrosis Sputum in Vitro," *Pediatric Pulmonol.* 20:78–82 (1995).
A.S. Wen et al., "Safety of Chest Physiotherapy in Asthma," *Am. J. Respir. Crit. Care Med.* 153: A77 (1996).
C.L. Wielinski & W.J. Warwick, "Changes in Pulmonary Function Over a 30–Month Period for High–Frequency Vest Users Verses Non–Users in a Cystic Fibrosis Population," *Am. J. Respir. Crit. Care Med.* 153: A71 (1996).
C.R. Majaestic et al., "Reduction in Sputum Viscosity Using High Frequency Chest Compressions (HFCC) Compared to Conventional Chest Physiotherapy (CCP)," *Pediatric Pulmonol.* Suppl. 13: 308 (1996).
M. Castagnino et al., "Safety of High–Frequency Chest Wall Oscillation (HFCWO) in Patients with Respiratory Muscle Weakness," *Chest* 110:655 (1996).
M. Mckinnon et al., "Optimal Sputum Cytology Collection Method," *Chest* 110: 1S (1996).
J. Kluft et al., "A Comparison of Bronchial Drainage Treatments in Cystic Fibrosis," *Pediatric Pumonol.* 22: 271–274 (1996).
C.M. Oermann et al., "Evaluation of the Safety, Efficacy and Impact on Quality of Life of the Thairapy Vest and Flutter Compared to Conventional Chest Physical Therapy (CPT) in Patients with Cystic Fibrosis," *Am. J. Respir. Crit. Care Med.* 155: A638 (1996).
"ThAIRapy Without Compromise," brochure from American Biosystems, Inc., dated May, 1993.
"Artifical Ventilation", *in Medical Tribune* (date unavailable).
"High–Frequency Chest Wall Oscillation," review from American Biosystems, Inc. (date unavailable).
R. Perry et al., "Effects of Positive End–Expired Pressure on Oscillated Tidal Volume During High Frequency Chest Compression," *Chest* 110: S65 (1996).
R. Perry et al., "Effects of Positive End–Expiratory Pressure on Oscillated Flow Rate During High–Frequency Chest Compression," *Chest* 113: 1028–1033 (1998).
K.A. Hardy & B.D. Anderson, "Noninvasive Clearance of Airway Secretions," *Respir. Care Clin. N. Am.* 2: 323–345 (1996).
D. Klous et al., "Chest Vest & CF: Better Care for Patients," *Adv. for Mgrs. of Resp. Care* 2: 45–50 (1993).
F. Ohnsorg, "A Cost Analysis of High–Frequency Chest–Wall Oscillation in Cystic Fibrosis," *Am. J. Respir. Crit. Care Med.* 149: A669 (1994).
L. Hansen et al., "Mucus Transport Mechanisms in Relation to the Effect of High–Frequency Chest Compression on Mucus Clearance," *Pediatric Pulmonol.* 17: 113–118 (1994).
W. Warwick et al., "High–Frequency Chest Compression Moves Mucus by Means of Sustained Staccato Coughs," *Pediatric Pulmonol.* Suppl. 6: 283 (1991).
A. Chiappetta et al., "High–Frequency Chest–Wall Oscillation: in Hospitalized Non–Cystic Fibrosis Patients," *Am. J. Respir.* 153: A566 (1994).
M. King et al., "Tracheal Mucus Clearance in High–Frequency Oscillation: Chest Wall vs. Mouth Oscillation," *Am. Rev. Respir. Dis.* 130: 703–706 (1984).
W. Naviaux et al., "Factors Altering Airflow During High Frequency Chest Wall Compression in Normal and Asthmatic Subjects," *Am. J. Respir. Crit. Care Med.* 157: A630 (1998).
R.D. Anbar et al., "Short–Term Effect of ThAIRapy® Vest on Pulmonary Function of Cystic Fibrosis Patients," *Am. J. Respir. Crit. Care Med.* 157: A130 (1998).
S. Butler & B. O'Neill, "High–Frequency Chest Compression Therapy: A Case Study," *Pediatric Pulmonol.* 19: 56–59 (1995).
S. D'Angelo et al., "How Are Patients Using Alternating Pressure Vests for Chest Physiotherapy?, " *Pediatric Pulmonol.* Suppl. 10: 266, A314 (1994).
S. D'Angelo et al., "Using Objective Data to Monitor and Increase Use of Chest Physiotherapy (CPT) in Patient Education," *Pediatric Pulmonol.* Suppl. 14: 327–328 (1997).
K.K. Hull & R.H. Warren, "ThAIRapy Vest vs. Conventional Chest Physical Therapy (CPT): Case Report," *Respir. Care* 36: 1266–1267 (1991).

T.A. Scherer, "Effect of High–Frequency Oral Airway and Chest Wall Oscillation and Conventional Chest Physical Therapy on Expectoration in Patients with Stable Cystic Fibrosis," *Chest* 113: 1019–1027 (1998).
A. Chiappetta & R. Beckerman, "High–Frequency Chest–Wall Oscillation in Spinal Muscular Atrophy," *RT J. Resp. Care Pract.* 8: 112–114 (1995).
A. Chiappettta & S. Davis, "Airway Clearance Practices of Respiratory Care Practioners, Physical Therapists and Physiotherapists from CF Centers," *Pediatric Pulmonol.* Suppl. 13: A353 (1996).
R. Behnia et al., "Biochemical Effects of High Frequency Vibration Ventilation in Normal Rats," *FASEB J.* 11: A129 (1997).
M.T. Williams, "Chest Physiotherapy and Cystic Fibrosis: Why Is the Most Effective Form of Treatment Still Unclear?," *Chest* 106: 1872–1880 (1994).
C.R. Hamm et al., "Ventilation by High Frequency Chest Wall Vibration in Saline Lavaged Rabbits," *Pediatr. Res.* 27: 305A (1990).
Y. Shabtai et al., "Compartmental Analysis of Gas Transport During High Frequency Vibration Ventilation with Tracheal Bias Flow," *Am. Rev. Respir. Dis.* 139: A596 (1989).
N. Gavriely & Y. Shabtai, "Gas Exchange by Vibration and Tracheal Bias Flow in Dogs," *Am. Rev Respir. Dis.* 135: A54 (1987).
N. Gavriely et al., "Gas Exchange During Combined High and Low Frequency Tidal Volume Ventilation in Dogs," *in Progress in Respiration Research,* vol. 21, Pulmonary Gas Exchange: International Symposium Goettingen, West Germany, Jul. 9–12, 1985 (M. Meyer & J. Piiper, eds., S. Karger, Basel, 1986), pp. 165–168.
Y. Shabtai et al., "Gas Exchange by High Frequency Chest Wall Vibration in Dogs," *Isr. J. Med. Sci.,* 21: 555 (1985).
L.K. Brown et al., "The Effect of High–Frequency Chest Wall Vibration on Ventilatory Drive and Pattern During $CO_2$ Rebreathing in Man," *Am. Rev. Respir. Dis.* 131: A129 (1985).
N. Gavriely et al., "Radiographic Visualization of Airway Wall Movement During Oscillatory Flow in Dogs," *J. Appl. Physiol.* 58: 645–652 (1985).
N. Gavriely et al., "Forced Expiratory Wheezes Are a Manifestation of Flow Limitation in Normal Subjects," *Am. Rev. Respir. Dis.* 129: A266 (1984).
N. Gavriely et al., "Effects of Superimposed Slow Oscillatory Flow on Carbon Dioxide Removal by Low Tidal Volume High Frequency Ventilation in Dogs," *Fed. Proc.* 43: 1298 (1984).
H. Bitterman et al., "Gas Exchange Maintained by High Frequency External Vibration," *Isr. J. Med. Sci.* 19: 98 (1983).
J. Solway et al., "Effect of Resident Gas Composition on Carbon Dioxide Output During High Frequency Ventilation," *Fed. Proc.* 42: 1350 (1983).
J. Solway et al., "Mechanism of Gas Transport During High Frequency Ventilation Investigations with Single Breath Nitorgen Washout Curves (SBNW))," *Am. Rev. Respir. Dis.* 125: 232 (1982).
J. Solway et al., "Distribution of Resistance to Gas Transport Within Airways During High Frequency Ventilation (hFV)," *Fed. Proc.* 41: 1692 (1982).
N. Gavriely et al., "mechanical Impedance of Endotracheal Tubes (ETT) During High Frequency Small Tidal Volume Ventilation (HFV)," *Fed. Proc.*41: 1627(1982).
N.H. Dodman et al., "Gas Conductance During High–Frequency Oscillatory Ventilation in Large Animals," *Am. J. Vet. Res.* 50: 1210–1214 (1989).
A.V. Sivachev, "Calculation of Dymanic Measuring Errors for the Main Parameters of forced Expiration," *Biomed. Eng.* 23: 61–65 (1989).
M. Noshiro et al., "Fuzzy and Conventional Control of High–Frequency Ventilation," *Med. Biol. Eng. Comput.* 32: 377–383 (1994).
K.S. Lee et al., "A Comparison of Underwater Bubble Continuous Positive Airway Pressure with Ventilator–Derived Continuous Positive Airway Pressure in Premature Neonates Ready for Extubation," *Biol. Neonate.* 73: 67–75 (1998).
M. Torry et al., "The Effect of Chest Wall Transcutaneous Electrical Nerve Stimulation on Dyspreen," *Respir. Physiol.* 104: 23–28 (1996).
D.M. Eckmann & N. Gavriely, "Chest Vibration Redistributes Intra–Airway $CO_2$ During Tracheal Insufflation in Ventilatory Failure," *Crit. Care Med.* 24: 451–457 (1996).
N. Gavriely et al., "Intra–Airway Gas Transport During High–Frequency Chest Vibration with Trachea Insufflation in Dogs," *J. Appl. Physiol.* 79: 243–250 (1995).
N. Gavriely et al., "Comparative Study of Intra–Airway Gas Transport by Alternative Modes of Ventilation," *J. Appl. Physiol.* 79: 1512–1518 (1995).
M.J. Goodwin, "Mechanical Chest Stimulation as a Physiotherapy Aid," *Med. Eng. Phys.* 16: 267–272 (1994).
M.L. Aitken et al., "Effect of Pulmonary Function of Oral High Frequency Oscillation in Normal and Asthmatic Subjects," *Respir. Med.* 86: 211–214 (1992).
H.L. Manning et al., "Effect of Chest Wall Vibration on Breathlessness in Normal Subjects," *J. Appl. Physiol.* 71: 175–181 (1991).
N. Gavriely et al., "Pressure–Flow Relationships of Endotracheal Tubes During High–Frequency Ventilation," *J. Appl. Physiol.* 59: 3–11 (1985).
J. Solway et al., "Effect of Bias Flow Rate on Gas Transport During High–Frequency Oscillatory Ventillation," *Respir. Physiol.* 60: 267–276 (1985).
W. Hida et al., "Effect of Local Vibration on Ventilatory Response to Hypercapnia in Normal Subjects," *Bull. Eur. Physiopathol. Respir.* 23: 227–232 (1987).
N. Gavriely & Y. Shabtai, "Effect of Tracheal Bias Flow on Gas Exchange During High–Frequency Chest Percussion," *J. Appl. Physiol.* 63: 302–308 (1987).
N. Gavriely & J.P. Butler, "Radial and Longitudinal Compartmental Analysis of Gas Transport During High–Frequency Ventilation," *J. Appl. Physiol.* 60: 1134–1144 (1986).
Y. Shabtai & N. Gavrieli, "Frequency and Amplitude Effects During High–Frequency Vibration Ventilation in Dogs," *J. Appl. Physiol.* 66: 1127–1135 (1989).
L. Freitag et al., "Mobilization of Mucus by Airway Oscillations," *Acta Anaesthesiol. Scand.* 33 Suppl 90: 93–101 (1989).
N. Gavriely et al., "Forced Expiratory Wheezes Are a Manifestation of Airway Flow Limitation," *J. Appl. Physiol.* 62: 398–403 (1987).
U.H. Sjostrand et al., "Conventional and High–Frequency Ventilation in Dogs with Bronchopleural Fistula," *Crit. Care Med.* 13: 191–193 (1985).
M.C. Khoo et al., "Gas Mixing During High–Frequency Ventilation: An Improved Model," *J. Appl. Physiol.* 57: 493–506 (1984).

T.H. Rossing et al., "Influence of the Endotracheal Tube on $CO_2$ Transport During High–Frequency Ventilation," *Am. Rev. Respir. Dis.* 129: 54–57 (1984).
H. Bitterman et al., "Respiration Maintained by Externally Applied Vibration and Tracheal Insufflatio in the Cat," *Anesth. Analg.* 62: 33–38 (1983).
A.C. Pinchak et al., "Beat Frequencies in High–Frequency Positive–Pressure Ventillation" *Crit. Care Med.* 12: 729–733 (1984).
J. Solway et al., "Intra–Airway Gas Mixing During High–Frequency Ventilation," *J. Appl. Physiol.* 56: 343–354 (1984).
T.M. Murray & B.J. Rosenstein, "Advances in the Science and Treatment of Cystis Fibrosis" (Duke University Medical Center & Health System, Durham, N.C., 1995), pp. iv, 16, 22.
D. Lemke & N. Torbett, "Cystic Fibrosis and Quality of Life: Airway Clearance Vest Helps Patients Breathe Easier," *Advance for Physical Therapists and PT Assistants* (Nov. 9, 1998), p. 1.
L. Cherek & N. Torbett, "The Role of Airway Clearance in the Patient with Respiratory Disease," *inside Case Management* (Nov. 1998), pp. 8–10.
C. Chambers et al., "Does High–Frequency Chest Compression (HFCC) During Aerosol Therapy Affect Lung Deposition," *Am. J. Respir. Crit. Care Med.* 157 (Suppl. 3): A131 (1998).
R.D. Anbar, "Compliance with Use of ThAIRapy® Vest by Patients with Cystic Fibrosis," *Pediatr. Pulmonol.* Suppl. 17: 346, A497 (1998).
R. Castile et al., "Comparison of Three Sputum Clearance Methods in In–Patients with Cystic Fibrosis," *Pediatr. Pulmonol.* Suppl. 17: 329, A443 (1998).
R.G. Clayton Sr. & M. Donahue, "ThAIRapy Use in 6 to 12 Year Old Children with Cystic Fibrosis," *Pediatr. Pulmonol.* Suppl. 17: 345, A496 (1998).
J.B. Fink & P.J. Fahey, "A Comparison of Common Bronchial Hygiene Devices and Their Effects on Esophageal Pressure," *Chest* 114: 293S (1998).
E.M. App. et al., "Physiotherapy and Mechanical Breakdown of the Excessive DNA Load in CF Sputum—An Anti–Inflammatory Therapeutic Strategy," *Pediatr. Pulmonol.* Suppl. 17: 349, A507 (1998).
R. Agostinis et al., "High–Frequency Chest Compression in Combination with–Hypertonic Saline Improves Induced Sputum Cytologic Yield" (Abstract Presented at ATS International Conference, MA 1995).
R. Jones et al., "Use of High–Frequency Chest Compression Plus Hypertonic Saline Aerosol to Provid Sputum Samples for Diagnosis of Lung Cancer" (Abstract Presented at the Alberta Respiratory Diseases Symposium, Jasper, Alberta, 1995).
F. Rhame et al., "Comparison of High Frequency Chest Compression with Hypertonic Saline for the Induction of Sputum" (Abstract Presented at VII International Conference on AIDS/III STD World Congress, Amsterdam, the Netherlands, Nov. 1992).
N.M. Al–Saady et al., "External High Frequency Oscillation in Normal Subjects and in Patients with Acute Respiratory Failure," *Anaesthesia* 50: 1031–1035 (1995).
T.E. Dolmage et al., "Chest Wall Oscillation at 1 Hz reduces Spontaneous Ventilation in Healthy Subjects During Sleep," *Chest* 110: 128–135 (1996).
D. Isabey & J. Piquet, "The Ventilatory Effect of External Oscillation," *Acta Anaesthesiol. Scand.* Suppl. 90: 87–92 (1989).
M.C.K. Khoo et al., "Effects of High–Frequency Chest Wall Oscillation on Respiratory Control in Humans," *Am. Rev. Respir. Dis.* 139: 1223–1230 (1989).
J. Piquet et al., "High–Frequency Transthoracic Ventilation Improves Gas Exchange During Experimental Bronchoncostriction in Rabbits," *Am. Rev. Respir. Dis.* 133: 605–608 (1986).
A. Zidulka et al., "Ventilation by High–Frequency Chest Wall Compression in Dogs with Normal Lungs," *Am. Rev. Respir. Dis.* 127: 709–713 (1983).
B. Langenderfer, "Alternatives to Percussion and Postural Drainage: A Review of Mucus Clearance Therapies: Percussion and Postural Drainage, Autogenic Drainage, Positive Expiratory Pressure, Flutte Valve, Intrapulmonary Percussive Ventilation, and High–Frequency Chest Compression with the Thairapy Vest," *J. Cardiopulmonary Rehabil.* 18: 283–289 (1998).
Product Brochure, "Percussionaire® Corporation Presents the Family of Intrapulmonary Percussionators® for the Administration of Intrapulmonary Percussive Ventilation (IPV®)," Percussionaire® Corporation, Sandpoint, Idaho, undated.
Product Brochure, "Vortran Medical Technology 1," with "Industry Profile: Vortran Medical Technology 1 Specializes in Innovated Devices," *AARC Times* (October 1999), and "Percussive NEB™: A Major Advance in Airway Clearance," (Mar. 2001), Sacramento, California.
Product Brochure, "Coughassist™," J.H. Emerson Co., Cambridge, Massachusetts, undated.
Product Brochure, "EzPAP® Positive Airway Pressure System," DHD Healthcare, Wampsville, New York, Feb. 2001.
Product Brochure, "Pari PEP® Positive Expiratory Pressure Device," Pari Respiratory Equipment, Inc., Midlothian, Virginia, Apr. 2000.
Product Brochure, "acapella®," DHD Healthcare, Wampsville, New York, Feb. 2001.
Product Brochure, "TheraPEP®," DHD Healthcare, Wampsville, New York, Mar. 2001.
Product Brochure, "TheraPEP®," DHD Healthcare, Canastota, New York, Aug. 26, 1997.
Summary, "High–Frequency Chest Wall Oscillation: Principles and Applications," Advanced Respiratory (formerly American Biosystems, Inc.), Aug. 2001.
Summary, "High–Frequency Chest Wall Oscillation Research," Advanced Respiratory (formerly American Biosystems, Inc.) Oct. 2001.
Annotated Bibliography, "High–Frequency Chest Wall Oscillation," Advanced Respiratory (formerly American Biosystems, Inc.), Apr. 2001.
Product Brochure, Minarik Corporation, "Motion Control Products, XP Series 1/20 to 1 HP," Minarik Corporation, Glendale, California, undated.
User's Manual, "XP–AC Series", Minarik Corporation, Glendale, California, Apr. 1996.

* cited by examiner

OSCILLATORY CHEST COMPRESSION DEVICE

Matter enclosed in heavy brackets [ ] appears in the original patent but forms no part of this reissue specification; matter printed in italics indicates the additions made by reissue.

This is a continuation of application Ser. No. 08/661,931, filed Jun. 11, 1996, now U.S. Pat. No. 5,769,797.

FIELD OF THE INVENTION

The present invention relates to an oscillatory chest compression device.

BACKGROUND OF THE INVENTION

Certain respiratory disorders, such as cystic fibrosis, emphysema, asthma, and chronic bronchitis, may cause mucous and other secretions to build up in a person's lungs. It is desirable, and sometimes essential, that the secretion build-up be substantially removed from the lungs to enable improved breathing. For example, [Cystic] *cystic* fibrosis is an hereditary disease that affects the mucous secreting glands of a person, causing an excessive production of mucous. The mucous fills in the person's lungs and must be reduced daily to prevent infection and enable respiration by the person.

Currently there is no cure for cystic fibrosis. Current treatment of cystic fibrosis includes an aerosol therapy to assist lung drainage and repeated pounding on the upper torso of the person to loosen and expel the mucous. This daily treatment may take several hours and requires a trained individual to apply the pounding treatment.

Pneumatic and mechanical systems have been developed for loosening and removing secretions from a person's lungs. In one pneumatic system, a bladder is positioned around the upper torso of the patient. One or more hoses connect the bladder with a mechanism for generating air pulses in the bladder. The pulsing of the bladder provides chest compressions to the patient. The pulsing frequency is independent of and higher than the patient's breathing rate. One such system, disclosed in U.S. Pat. No. 4,838,263, is a valve-operated, open-loop system that requires the patient to interact with the system throughout the treatment period.

Other systems include mechanical vibrators. Some vibrator systems are attached to the person's torso, while others are hand-held. Vibrators and other direct mechanical compression devices are likely to be heavier than pneumatic compression devices.

A chest compression device, as is the case with medical devices generally, must meet a variety of requirements. First, the chest compression device must be safe to operate. The patient receiving treatment should not be able to adjust the device to create unsafe treatment conditions. Failure of device components must not create unsafe conditions. The chest compression device should provide some user control, allowing the device to be customized to the needs of individual users. The device should be easy to understand and operate by the user; detailed training and complicated controls increase the cost of the treatment. Finally, the device should minimize intrusion into the daily activities of the user.

SUMMARY OF THE INVENTION

The present invention is directed to an oscillatory chest compression device that loosens and assists in expulsion of secretions in a person's lungs. A vest, containing a bladder, is secured to a patient's upper torso. One or more tubes connect the bladder with a generator. The generator includes a first, oscillatory air flow generator. A second, positive air flow generator is operably connected with the oscillatory air flow generator. Feedback systems control both the oscillatory air flow generator and the positive air flow generator, providing treatment at user-selected parameters and preventing unsafe conditions.

The inventors of the present invention were the first to recognize several design aspects that result in an efficacious, safe, and easy-to-use oscillatory chest compression device. The oscillatory air flow generator includes a reciprocating diaphragm. The reciprocating diaphragm delivers a generally constant pressure throughout the range of oscillation frequencies, providing efficacious treatment throughout the range of user-selectable frequency settings. The reciprocating diaphragm provides a more efficient transfer of electrical energy to pneumatic energy as compared to prior rotary-valve designs.

One major safety concern is a pneumatic chest compression device is over-pressurization of the bladder. The reciprocating diaphragm provides inherently safe pressure conditions. The only way a reciprocating diaphragm can increase pressure in the bladder is to increase the diaphragm stroke length or diameter. However, there is no failure mode that will increase the stroke length or diameter of the reciprocating diaphragm.

The present invention includes a positive air flow generator operably connected with the oscillatory air flow generator. The positive air flow generator compensates for any leakage in the system, including the hoses and bladder. Also, the positive air flow generator, in connection with a feedback system, maintains the desired peak pressure delivered by the bladder, independent of variations in the bladder and the patient. The positive air flow generator includes the safety feature of a fuse connected with the input power. The fuse is rated so as to prevent a power surge from causing the positive air flow generator to generate an unsafe, high pressure.

The oscillatory chest compression device of the present invention is automated, allowing the user to select operating parameters for a treatment and then direct his attention to other matters. The feedback systems of the present invention maintain the user-selected parameters during the treatment. The user controls are selected so that the user cannot select operating parameters that would result in unsafe chest compression treatment.

Other advantages and features will become apparent from the following description and claims.

BRIEF DESCRIPTION OF THE DRAWINGS

These and other aspects of the present invention will be described in detail with respect to the accompanying drawings, in which.

DETAILED DESCRIPTION OF THE EMBODIMENTS

Figure 1:
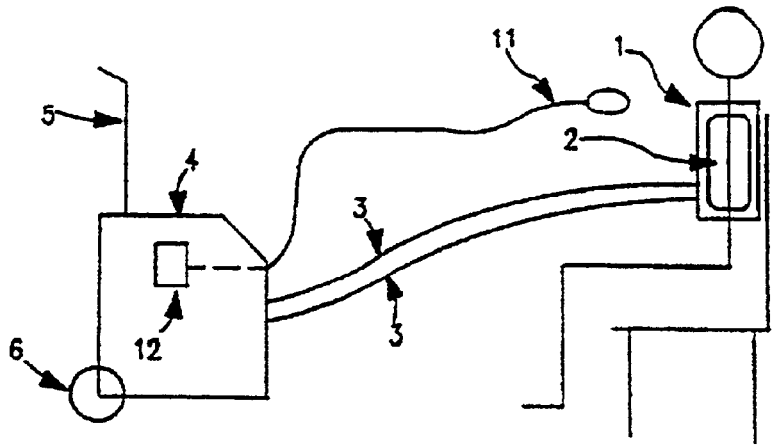
FIG. 1 is an illustration of a person and a chest compression device.

A chest compression device is shown in FIG. 1. A vest 1 is secured about the torso of a patient. A bladder 2 is fitted within vest 1. Oscillatory air pulses are delivered to bladder 2. The outer surface of vest 1 is made of a non-stretch material, causing the expansions and contractions of bladder 2 to occur generally adjacent the patient's torso. The expansions and contractions create a pneumatic, oscillatory compression of the patient's torso to loosen and assist the expulsion of mucous and other secretions in the patient's lungs. Suitable vests are available from American Biosystems, Inc., St. Paul, Minn., the assignee of the present invention.

Figure 3:
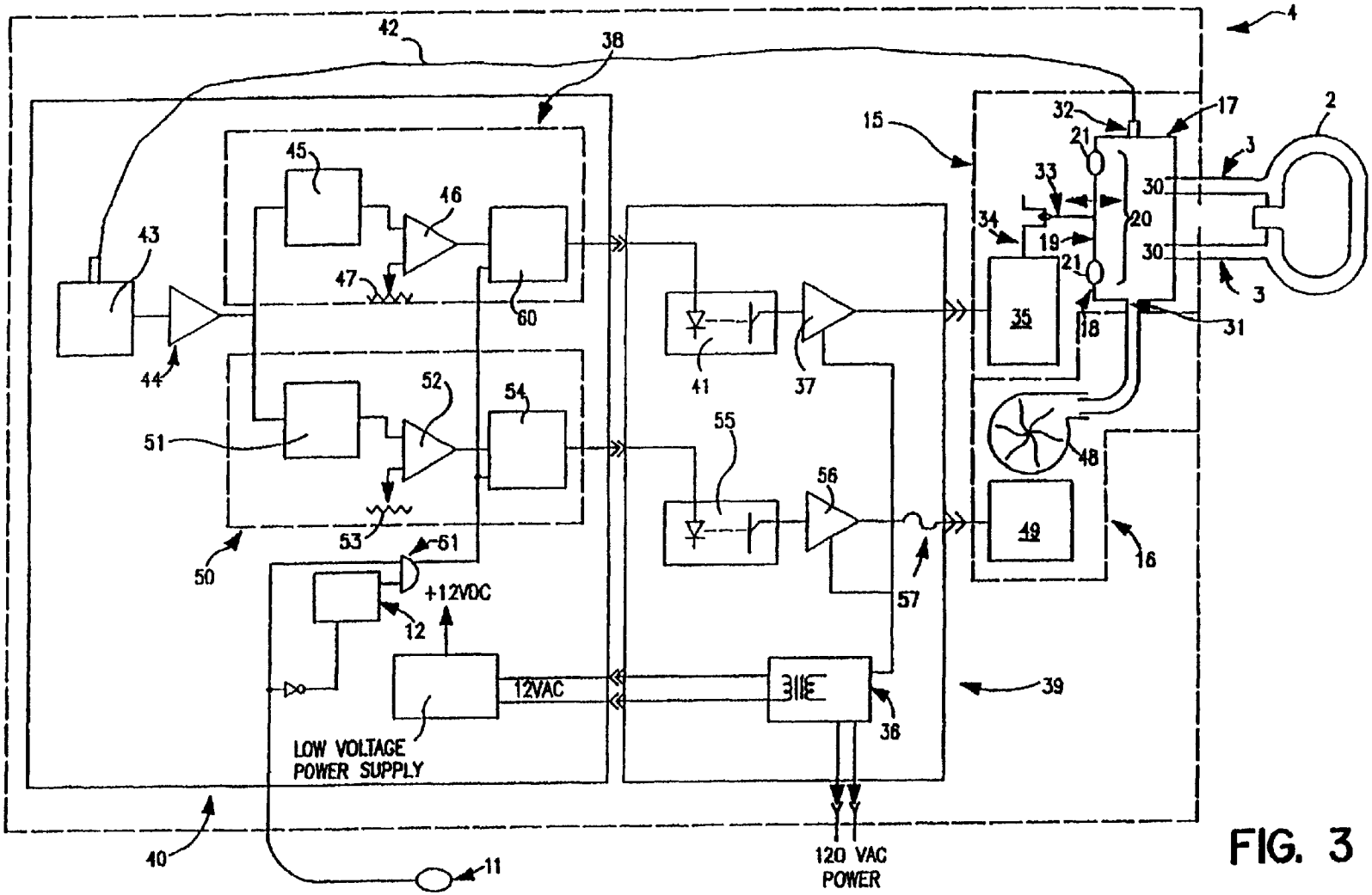
FIG. 3 is a schematic diagram of a chest compression device.

Tubes 3 connect bladder 2 with generator 4. Two tubes 3 are shown in FIGS. 1 and 3; however, the number of tubes 3 may be varied depending on the desired operating parameters of bladder 2. Generator 4 generates oscillatory air pulses in accordance with user-selected settings. The pulses are converted into compressions of the patient's torso by bladder 2. Generator 3 may be configured as a mobile unit with handle 5 and wheels 6, or as a stationary unit.

Figure 2:
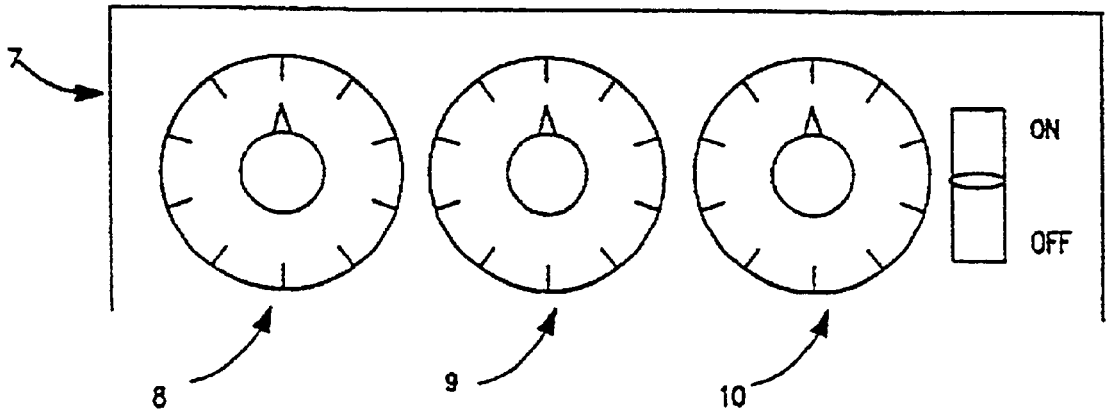
FIG. 2 is a schematic diagram of the control panel of a chest compression device.

Generator 4 includes a control panel 7, shown in FIG. 2. Timer 8 allows the user to select a treatment period. Frequency selector 9 allows the user to select the frequency of compression. In one embodiment, the frequency range is about five to twenty-five Hz. Pressure selector 10 allows the user to select the peak pressure for each oscillation. In one embodiment, the pressure range is about 0.2 to 0.6 PSI.

As shown in FIG. 1, the user typically is seated during treatment. However, the user has some local mobility about generator 4, determined by the length of hoses 3. Also, the mobile unit shown in FIG. 1 may be easily transferred to different locations. For treatment, the user selects the desired operating parameters and no further interaction by the user is required; generator 4 maintains the user-selected parameters. The user may change the settings at any time. A remotely-operated control 11 allows the user to start and stop the treatment.

Generator 4 also includes a ten-minute safety timer 12. Once the user initiates treatment, safety timer 12 starts. Safety timer 12 is reset each time the user activates start/stop control 11. If the safety timer expires, generator 4 is turned off. Thereof, even if the user loses consciousness or is otherwise incapacitated, generator 4 is turned off after a predetermined period, reducing the likelihood of injury to the user due to an excessive period of chest compressions.

A block diagram of generator 4 is shown in FIG. 3. Generator 4 includes two of air flow units, oscillatory air flow generator 15 and positive air flow generator 16. Oscillatory air pulses are generated by oscillatory air flow generator 15. Oscillatory air flow generator 15 includes an air chamber 17. Air chamber 17 includes a wall 18 having a reciprocating diaphragm 19 suspended in an aperture 20 of wall 18 by a seal 21.

Figure 4:
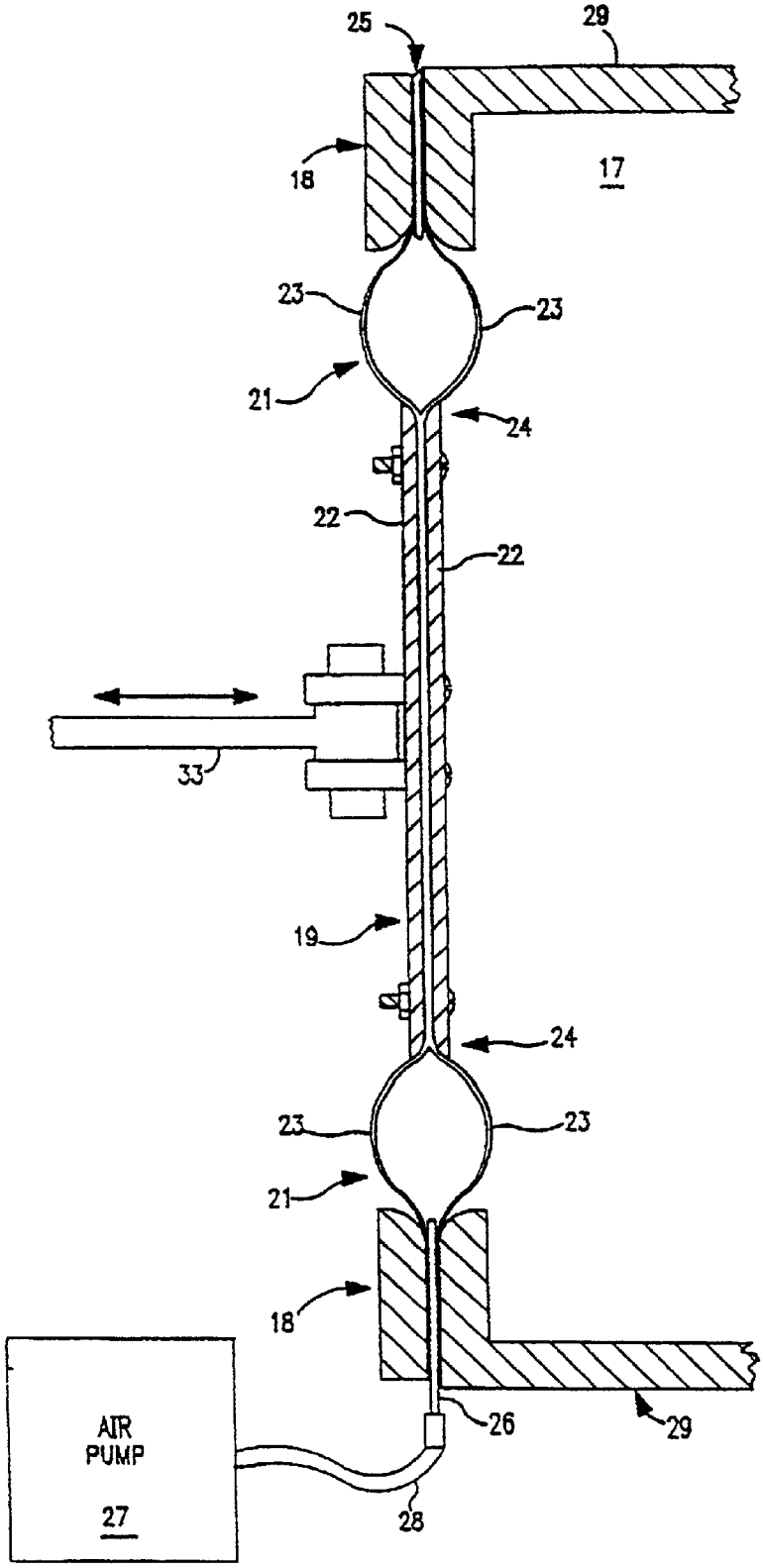
FIG. 4 is a schematic diagram of a portion of a chest compression device.

As shown in FIG. 4, diaphragm 19 is a generally rigid disk assembly of two opposed, generally circular disks 22. Flexible, air-tight seal 21 is formed by two rubber disks 23 positioned between diaphragm disks 22. Diaphragm disks 22 are clamped together by bolts or other fastening means. Rubber disks 23 extend from the outer periphery 24 of diaphragm disks 22 into a groove 25 in wall 18, thereby forming a generally air-tight seal in the gap between diaphragm 19 and wall 18.

Air pressure is supplied to seal 21 by capillary tube 26, which is supplied by air pump 27 and tubing 28. Air pump 27 maintains the air pressure in seal 21 higher than the maximum pressure peaks in air chamber 17. In one embodiment, the air pressure in seal 21 is maintained at about 1.5 PSI. The pressure relationship causes rubber disks 23 to maintain the inflated shape as shown in FIG. 4 as diaphragm 19 reciprocates. This results in a smooth, quiet, low-friction travel of diaphragm 19, while maintaining an airtight seal between diaphragm 19 and wall 18.

The remaining walls 29 of air chamber 17 are generally rigid. Apertures 30 provide fluid communication between air chamber 17 and tubes 3. Aperture 31 provides fluid communication with positive air flow generator 16. Aperture 32 provides fluid communication with the control system described below.

Diaphragm 19 is mechanically connected through rod 33 to a crankshaft 34, which is driven by motor 35. Each rotation of crankshaft 34 causes a fixed volume of air (defined by the area of the diaphragm multiplied by the length of the stroke) to be displaced in air chamber 17. The pressure changes inside air chamber 17 resulting from the displacements are relatively small (e.g., less than one PSI) in comparison to the ambient air pressure. Therefore, there is little compression of the air in air chamber 17 and the majority of the displaced air is moved into and out of bladder 2 through tubes 3 during each cycle. This results in the amount of air transferred into and out of bladder 2 during each cycle being largely independent of other factors, such as the oscillation frequency and bladder size.

In one embodiment, motor 35 is a permanent magnet DC brush motor. The motor speed is generally controlled by the voltage supplied to it. A 170 volt DC power supply 36 energizes power amplifier 37. Power amplifier 37 is controlled by a frequency-compensation feedback circuit 38, thereby supplying variable length pulses to motor 35. The inductance of motor 35 effectively smoothes the pulses to a constant power level that is proportional to the ratio of the pulse length divided by the pulse period. Using a pulse period of 20 kHz, the pulse length controls the motor speed.

As shown in FIG. 3, all of the power circuitry is located on power board 39. The control circuitry is located on a separate, low-energy control board 40. The control board 40 is connected to the power board 39 by 5000-volt opto-isolators 41, 55. The high level of isolation between the power board 39 and control board 40 provides significant shock protection for the user.

Conduit 42 conveys changes in pressure from air chamber 17 to pressure transducer 43. Pressure transducer 43 converts the air pressure into an oscillating electronic signal, which is then amplified by amplifier 44. The output of amplifier 44 is then processed by frequency-compensation feedback circuit 38.

Frequency-to-voltage converter 45 converts the oscillating signal to a voltage level proportional to the frequency. The output of converter 45 is fed to difference amplifier 46. Difference amplifier 46 has a second input 47 representing the user-selected frequency setting. Difference amplifier 46 compares the voltage representing the user-selected frequency with the voltage representing the actual frequency detected in air chamber 17. The output of difference amplifier 46 is input into pulse-width modulator 60. The output of pulse-width modulator 60 is fed through opto-isolator 41 and power amplifier 37 to motor 35, thereby adjusting the speed of motor 35 and, consequently, the oscillation frequency in air chamber 17.

Reciprocating diaphragm 19 of oscillatory air flow generator 15 provides several advantages. First, the amount of air transferred into and out of bladder 2 during each cycle is largely independent of the oscillation frequency setting. In prior art systems, using a constant air flow and valve configuration, less air flow was delivered at higher frequencies. Therefore, the present invention provides a more consistent air flow over the user selectable frequency range. This consistency provides a more efficacious treatment.

Further, reciprocating diaphragm 19 is both efficient and safe. The substantially closed-loop reciprocating diaphragm configuration provides a more efficient transfer of electrical energy to pneumatic energy as compared to prior art valve designs. Also, the reciprocating diaphragm provides inherently safe air flow.

One of the main safety concerns with bladder-type chest compression systems is over-inflation of the bladder. In a reciprocating diaphragm system, there is no net increase in pressure, i.e., the air flow on the in-stroke equals the air flow on the out-stroke. The only way to increase air flow is to increase the diaphragm stroke length or the surface area of the diaphragm. In the present invention, there is no failure mode that could cause either an increased stroke length or increased diaphragm surface area. Conversely, in valve-operated pneumatic devices, a malfunction of a valve may cause unsafe pressures to develop in bladder 2.

Frequency-compensation feedback system 38 serves to maintain the oscillation frequency at the user-selected value. Also, frequency selector 9 is calibrated so that oscillatory air flow generator 15 operates at a maximum oscillation rate as the default value, and frequency selector 9 can only decrease the oscillation frequency. The maximum default oscillation rate is selected to be within safe parameters, therefore, the user cannot increase the oscillation rate to an unsafe level.

Although diaphragm 19 approximates a perfect system in terms of displacement of air into and out of bladder 2 on each stroke, remaining parts of the closed system are less perfect. For example, bladder 2 typically leaks air at a variable rate that is difficult to model. The amount of air leakage is influenced by many factors, including variations in production of the bladder, age, use, and other factors.

Also, tubes 3 and the various connections within the system may also leak. Additionally, the air pressure delivered to bladder 2 must be varied due to the repeated inhalation and expiration of the user during treatment, and also due to the size of the particular user. Therefore, positive air pressure generator 16 is used to supply positive air pressure to the system to compensate for the above-identified variables.

Positive air flow generator 16 includes a blower 48 driven by motor 49. The speed of motor 49 is controlled by pressure-compensation feedback system 50, thereby controlling the output pressure of blower 48.

As shown in FIG. 3, pressure-compensation feedback system 50 is similar to frequency-compensation feedback system 38. The output of pressure transducer 43 is fed through amplifier 44 to a pressure peak detector 51. Peak detector 51 captures the pressure waveform peaks within air chamber 17 and generates a voltage proportional to the pressure peak. This voltage is fed to difference amplifier 52.

Difference amplifier 52 includes a second input 53 representing the user-selected pressure. The difference in actual peak pressure and selected peak pressure is represented in the voltage output of difference amplifier 52 and is fed to pulse-width modulator 54. The output of pulse-width modulator 54 is fed through a second opto-isolator 55 and a second power amplifier 56 on power board 39 to motor 49. Motor 49 drives blower 48 to maintain the peak pressure in air chamber 17 at the user-selected value.

One of ordinary skill in the art will recognize that the pressure in air chamber 17 may also be detected by a flow of air from air chamber 17 into blower 48, depending on the pressure in air chamber 17 compared to the pressure created by blower 48. In one embodiment, blower 48 may be reversible.

Positive air flow generator 16 and pressure-compensation feedback system 50 provides several advantages. First, positive air flow generator 16 dynamically adjusts the peak pressure in air chamber 17 to provide a consistent peak pressure based on the user selected peak pressure, independent of leaks in the system, size of the user, condition of the bladder, and the repeated inhalation and expiration of the user. Maintaining a constant peak pressure provides for increased efficacy of treatment.

Also, the user only has to make an initial pressure selection, no further interaction with generator 4 is required. The maximum peak pressure setting is selected to be within a safe treatment range. As an additional safety feature, fuse 57 serves to prevent a power surge in power supply 36 from causing blower 48 to inflate bladder 2 to an unsafe pressure.

The circuit for user-operated start/stop control 11 and safety timer 12 are also shown in FIG. 3. In one embodiment, control 11 is a pneumatic switch of known construction. In other embodiments, control 11 may be electronic or electro-mechanical. Actuation of control 11 serves to reset safety timer 12 and also control pulse width modulators 60, 54. The AND gate 61 requires that safety timer 12 be active (i.e., not zero) and control 11 be ON in order for generator 4 to create air pulses.

It is important to note the general ease-of-use provided by the present invention. To initiate treatment, the user simply puts on vest 2 and selects operating parameters on control panel 7, very little training is required. This helps keep down the total cost of the treatment. Also, the user is not required to constantly interact with the device during treatment.

Other embodiments are within the scope of the following claims.

What is claimed is:

1. An apparatus for generating oscillatory air pulses in a bladder positioned about a person, comprising:

an oscillatory air flow generator, comprising:

an air chamber;

a reciprocating diaphragm operably connected with the air chamber, a rod having a first end and a second end, the first end operably connected with the diaphragm, and the rod extending generally orthogonal to the diaphragm;

a crankshaft operably connected with the second end of the rod and extending generally orthogonal to the rod; and a first motor operably connected with the crankshaft;

a continuous air flow generator operably connected with the oscillatory air flow generator;

a first feedback and control means operably connected with the oscillatory air flow generator for maintaining [the] *a* frequency of the oscillatory air flow generator at a predetermined value;

and a second feedback and control means operably connected with the continuous air flow generator for continuously varying [the] *an* output pressure of the continuous air flow generator in order to maintain [the] *a* peak pressure generated by the [positive] *continuous* air flow generator at a predetermined value.

2. The apparatus of claim 1 further comprising means for connecting the oscillatory air flow generator with a bladder.

3. The apparatus of claim 1 wherein the first feedback and control means comprises:

means for detecting the oscillation rate in the air chamber;

means for comparing the oscillation rate with the predetermined value; and means for adjusting the oscillatory air flow generator so that the detected oscillation rate approximately equals the predetermined value.

4. The apparatus of claim 1 further comprising a frequency selector, allowing a user to select the predetermined frequency.

5. The apparatus of claim 1 wherein the continuous air flow generator comprises a blower, and a second motor operably connected with the blower.

6. The apparatus of claim 5 further comprising means connected to the second motor for preventing the second motor from operating the blower above a predetermined pressure.

7. The apparatus of claim 6 wherein the means for preventing comprises a fuse.

8. The apparatus of claim 1 wherein the second feedback and control means comprises:

means for detecting the peak pressure in the air chamber;

means for comparing the detected peak pressure with the predetermined value; and means for adjusting the continuous air flow generator so that the detected peak pressure equals the predetermined value.

9. The apparatus of claim 1 further comprising a pressure selector, allowing a user to select the predetermined peak pressure.

10. The apparatus of claim 1, further comprising a remote start/stop control operably connected with the first and second feedback and control means.

11. The apparatus of claim 10 further comprises a timer operably connected with the remote start/stop control.

12. The apparatus of claim 1, further comprising a seal extending from an outer periphery of the diaphragm to a wall of the air chamber, the seal comprising first and second generally opposed disks defining an annular region for receiving air, and a pump operably connected with the annular region, the pump maintaining the air pressure in the annular region greater than the peak pressure generated in the air chamber.

*13. An apparatus for generating oscillatory air pulses in a bladder positioned about a person, comprising:*

*an oscillatory air flow generator comprising:*

*an air chamber;*

*a reciprocating diaphragm operably connected with the air chamber;*

*a rod having a first end and a second end, the first end operably connected with the diaphragm, and the rod extending generally orthogonal to the diaphragm;*

*a crankshaft operably connected with the second end of the rod and extending generally orthogonal to the rod; and*

*a first motor operably connected with the crankshaft;*

*a positive air flow generator operably connected with the oscillatory air flow generator;*

*a first feedback and control means operably connected with the oscillatory air flow generator for maintaining a frequency of the oscillatory air flow generator at a predetermined value; and*

*a second feedback and control means operably connected with the positive air flow generator for dynamically adjusting an output pressure of the positive air flow generator in order to maintain a positive pressure generated by the positive air flow generator at a predetermined value.*

*14. The apparatus of claim 13 wherein the positive pressure is constant.*

*15. The apparatus of claim 13 wherein the positive pressure is consistent.*

*16. An apparatus for generating oscillatory air pulses in a bladder positioned about a person, comprising:*

*an oscillatory air flow generator comprising:*

*an air chamber;*

*a reciprocating diaphragm operably connected with the air chamber;*

*a rod having a first end and a second end, the first end operably connected with the diaphragm, and the rod extending generally orthogonal to the diaphragm;*

*a crankshaft operably connected with the second end of the rod and extending generally orthogonal to the rod; and*

*a first motor operably connected with the crankshaft;*

*a positive air flow generator operably connected with the oscillatory air flow generator;*

*a first feedback and control means operably connected with the oscillatory air flow generator for maintaining a frequency of the oscillatory air flow generator at a predetermined value; and*

*a second feedback and control means operably connected with the positive air flow generator for maintaining a positive pressure at a predetermined value.*

*17. The apparatus of claim 16 wherein the positive pressure is maintained at a constant pressure.*

*18. The apparatus of claim 16 wherein the positive pressure is maintained at a consistent pressure.*

*19. An apparatus for generating oscillatory air pulses in a bladder positioned about a person, comprising:*

*an oscillatory air flow generator comprising:*

*an air chamber;*

*a reciprocating diaphragm operably connected with the air chamber;*

*a rod having a first end and a second end, the first end operably connected with the diaphragm, and the rod extending generally orthogonal to the diaphragm;*

*a crankshaft operably connected with the second end of the rod and extending generally orthogonal to the rod; and*

*a first motor operably connected with the crankshaft;*

*a positive air flow generator operably connected with the oscillatory air flow generator;*

*a frequency-compensation feedback system operably connected with the oscillatory air flow generator, wherein the frequency-compensation feedback system maintains a frequency of the oscillatory air flow generator at a predetermined value; and*

*a pressure-compensation feedback system operably connected with the positive air flow generator, wherein the pressure-compensation feedback system maintains a positive pressure at a predetermined value.*

*20. The apparatus of claim 19 wherein the positive pressure is maintained at a constant pressure.*

*21. The apparatus of claim 19 wherein the positive pressure is maintained at a consistent pressure.*

*22. The apparatus of claim 19 wherein the pressure-compensation feedback system dynamically adjusts an output pressure of the positive air flow generator to maintain the positive pressure at the predetermined value.*

*23. The apparatus of claim 22 wherein the pressure-compensation feedback system maintains a peak pressure.*

*24. The apparatus of claim 19 wherein the pressure-compensation feedback system maintains the positive pressure by flowing air from the apparatus.*

*25. The apparatus of claim 19 wherein the pressure-compensation feedback system dynamically adjusts the positive air flow generator to maintain the positive pressure at the predetermined value.*

*26. The apparatus of claim 25 wherein the pressure-compensation feedback system dynamically adjusts a speed of the positive air flow generator.*

*27. The apparatus of claim 25 wherein the pressure-compensation feedback system dynamically adjusts an output pressure of the positive airflow generator.*

*28. The apparatus of claim 25 wherein the pressure-compensation feedback system dynamically adjusts an output flow of the positive air flow generator.*

*29. The apparatus of claim 25 wherein the pressure-compensation feedback system dynamically adjusts the positive air flow generator by flowing air from the apparatus.*

*30. The apparatus of claim 19 wherein the pressure-compensation feedback system continuously varies an output pressure of the positive air flow generator in order to maintain a peak pressure generated by the positive air flow generator at a predetermined value.*

*31. An apparatus for generating oscillatory air pulses in a bladder positioned about a person comprising:*

*an oscillatory air flow generator comprising:*

*an air chamber;*

*a reciprocating diaphragm operably connected with the air chamber; and*

*a first motor operably connected with the reciprocating diaphragm;*

*a positive air flow generator operably connected with the oscillatory air flow generator;*

*a frequency-compensation feedback system operably connected with the oscillatory air flow generator, wherein the frequency-compensation feedback system maintains a frequency of the oscillatory air flow generator at a predetermined value; and*

*a pressure-compensation feedback system operably connected with the positive air flow generator, wherein the pressure-compensation feedback system maintains a positive pressure at a predetermined value.*

*32. The apparatus of claim 31 wherein the pressure-compensation feedback system dynamically adjusts the positive air flow generator to maintain a positive pressure generated by the positive air flow generator at a predetermined value.*

*33. The apparatus of claim 31 wherein the first motor has a shaft mechanically connected to the reciprocating diaphragm.*

*34. The apparatus of claim 33 wherein rotation of the shaft reciprocates the reciprocating diaphragm in a cycle and each cycle of the reciprocating diaphragm displaces a fixed volume of air.*

*35. The apparatus of claim 34 wherein the reciprocating diaphragm causes pressure changes inside the air chamber in comparison to ambient pressure.*

*36. The apparatus of claim 35 wherein the pressure changes are small in comparison to ambient pressure.*

*37. The apparatus of claim 35 wherein the pressure changes are less than or equal to about 1 psi.*

*38. The apparatus of claim 35 wherein a majority of the fixed volume of air is moved into and out of the bladder during each cycle.*

*39. The apparatus of claim 31 wherein the reciprocating diaphragm comprises a seal extending from the outer periphery of the reciprocating diaphragm to a wall of the air chamber.*

*40. The apparatus of claim 31 wherein the oscillatory generator further comprises:*

*a shaft operably connected to the first motor; and*

*a connecting member operably connecting the shaft to the reciprocating diaphragm.*

*41. The apparatus of claim 40 wherein the shaft comprises a crankshaft and the connecting member comprises a rod.*

*42. The apparatus of claim 40 wherein the reciprocating diaphragm comprises a seal generally orthogonal to the connecting member.*

*43. An apparatus for generating oscillatory air pulses in a bladder positioned about a person, comprising:*

*a generator comprising:*

*an air chamber;*

*a reciprocating diaphragm operably connected with the air chamber;*

*a first motor operably connected with the reciprocating diaphragm; and*

*wherein the generator provides a positive pressure and an oscillatory pressure;*

*a frequency-compensation feedback system operably connected with the generator, wherein the frequency-compensation feedback system maintains an oscillation frequency at a predetermined value; and*

*a pressure-compensation feedback system operably connected with the generator, wherein the pressure-compensation feedback system maintains the positive pressure at a predetermined value.*

*44. An apparatus for generating oscillatory air pulses in a bladder positioned about a person, comprising:*

*a generator comprising an oscillatory air flow generator and a positive air flow generator, the generator providing a positive pressure and an oscillatory pressure;*

*the oscillatory air flow generator comprising:*

*an air chamber;*

*a reciprocating diaphragm operably connected with the air chamber; and*

*a first motor operably connected with the reciprocating diaphragm;*

*the positive air flow generator operably connected with the oscillatory air flow generator;*

*a frequency-compensation feedback system operably connected with the generator, wherein the frequency-compensation feedback system maintains an oscillation frequency at a predetermined value; and*

*a pressure-compensation feedback system operably connected with the generator, wherein the pressure-compensation feedback system maintains the positive pressure at a predetermined value.*

*45. The apparatus of claim 44 wherein the apparatus loosens and assists expulsion of mucus from lungs of the person.*

*46. The apparatus of claim 44 wherein the oscillation frequency is independent and higher than a breathing rate of the person.*

*47. The apparatus of claim 44 wherein the oscillation frequency is between about 5 Hz to about 25 Hz.*

*48. The apparatus of claim 44 wherein the positive pressure is between about 0.2 psi to about 0.6 psi.*

*49. The apparatus of claim 44 wherein the positive pressure is a user selected pressure setting.*

*50. The apparatus of claim 44 wherein the oscillation frequency is a user selected frequency setting.*

*51. The apparatus of claim 44 wherein the positive pressure is a constant pressure.*

*52. The apparatus of claim 44 wherein the positive pressure is a consistent pressure.*

*53. The apparatus of claim 44 wherein the pressure-compensation feedback system maintains a pressure in the bladder above ambient pressure.*

*54. The apparatus of claim 44 wherein the pressure-compensation feedback system adjusts the positive pressure to allow repeated inhalation and expiration of the person.*

*55. The apparatus of claim 44 wherein the pressure-compensation feedback system maintains the positive pressure irrespective of repeated inhalation and expiration of the person.*

*56. The apparatus of claim 44 wherein the pressure-compensation feedback system varies the positive pressure to maintain the positive pressure at the predetermined value.*

*57. The apparatus of claim 44 wherein the pressure-compensation feedback system detects a peak pressure.*

*58. The apparatus of claim 44 wherein the pressure-compensation feedback system maintains the positive pressure throughout a range of oscillation frequencies.*

*59. The apparatus of claim 44 wherein the pressure-compensation feedback system maintains the positive pressure at the predetermined value independent of variations of the bladder.*

*60. The apparatus of claim 44 wherein the pressure-compensation feedback system detects the positive pressure, compares the positive pressure to a predetermined value, and adjusts the positive pressure to the predetermined value.*

*61. The apparatus of claim 60 wherein the pressure-compensation feedback system is an electrical feedback system.*

*62. The apparatus of claim 60 wherein the pressure-compensation feedback system detects the positive pressure using a pressure transducer.*

*63. The apparatus of claim 60 wherein the predetermined value is a user selected value.*

*64. The apparatus of claim 60 wherein the pressure-compensation feedback system adjusts the positive pressure by changing an output of the generator.*

*65. The apparatus of claim 64 wherein a pressure of the output of the generator is reduced.*

*66. The apparatus of claim 64 wherein a flow of the output of the generator is reduced.*

*67. The apparatus of claim 66 wherein the flow of the output is reduced by flowing air out of the generator.*

*68. The apparatus of claim 64 wherein the output of the generator is independent of the oscillation frequency.*

*69. The apparatus of claim 44 wherein the frequency-compensation feedback system detects the oscillation frequency, compares the oscillation frequency to a predetermined value, and adjusts the oscillation frequency to the predetermined value.*

*70. The apparatus of claim 69 wherein the frequency-compensation feedback system detects the oscillation frequency by detecting the oscillatory pressure.*

*71. The apparatus of claim 69 wherein the frequency-compensation feedback system detects the oscillation frequency by detecting the motor speed.*

*72. The apparatus of claim 69 wherein the frequency-compensation feedback system comprises a pressure transducer.*

*73. The apparatus of claim 72 wherein the pressure transducer converts air pressure into an oscillating electrical signal.*

*74. The apparatus of claim 72 wherein the frequency-compensation feedback system provides a voltage level proportional to the oscillation frequency.*

*75. The apparatus of claim 69 wherein the frequency-compensation feedback system compares the oscillation frequency to a predetermined value by comparing voltages.*

*76. The apparatus of claim 69 wherein the frequency-compensation feedback system adjusts the oscillation frequency by changing the motor speed.*

*77. An apparatus for generating oscillatory air pulses in a bladder positioned about a person, comprising:*

*a generator comprising an oscillatory air flow generator and a positive air flow generator, the generator providing a positive pressure and an oscillatory pressure;*

*the oscillatory air flow generator comprising:*

*an air chamber;*

*a reciprocating diaphragm operably connected with the air chamber; and*

*a first motor operably connected with the reciprocating diaphragm;*

*the positive air flow generator operably connected with the oscillatory air flow generator;*

*a frequency-compensation feedback system operably connected with the generator, wherein the frequency-compensation feedback system maintains an oscillation frequency at a predetermined value; and*

*wherein the generator maintains the positive pressure at a predetermined value irrespective of the repeated inhalation and expiration of the person.*

*78. The apparatus of claim 77 wherein the generator dynamically adjusts and controls the positive pressure to allow repeated inhalation and expiration of the person.*

*79. The apparatus of claim 77 further comprising a control panel, the control panel for user-selection of operating parameters.*

*80. The apparatus of claim 77 wherein the reciprocating diaphragm comprises a seal extending from the outer periphery of the reciprocating diaphragm to a wall of the air chamber.*

*81. The apparatus of claim 77 wherein the first motor has a shaft mechanically connected to the reciprocating diaphragm;*

*wherein rotation of the shaft reciprocates the reciprocating diaphragm in a cycle; and*

*wherein each cycle of the reciprocating diaphragm displaces a fixed volume of air.*

*82. The apparatus of claim 81 wherein the reciprocating diaphragm causes pressure changes inside the air chamber in comparison to ambient pressure and wherein a majority of the fixed volume of air is moved into and out of a bladder during each cycle.*

*83. The apparatus of claim 77 wherein the frequency-compensation feedback system maintains an oscillation frequency at a predetermined value between about 5 Hz to about 25 Hz.*

*84. The apparatus of claim 77 further comprising a vest comprising a bladder, the vest for placement about a torso of the person, the bladder positioned such that expansions and contractions of the bladder occur generally adjacent to the torso of the person.*

*85. The apparatus of claim 84 further comprising at least one tube operably connecting the bladder to the generator.*

*86. The apparatus of claim 84 wherein the bladder causes oscillatory compression of the torso of the person.*

*87. The apparatus of claim 77 wherein mucus from lungs of the person is loosened and expulsion of the mucus is assisted.*

*88. The apparatus of claim 84 wherein treatment is initiated by placing the vest around the torso of the person and selecting operating parameters on a control panel without further interaction required by the person with the apparatus during treatment.*

*89. An apparatus for generating oscillatory air pulses in a bladder positioned about a person, comprising:*

*a generator comprising a control panel, an oscillatory air flow generator and a positive air flow generator;*

*the control panel for user-selection of operating parameters;*

*the generator providing a positive pressure and an oscillatory pressure, the positive pressure above ambient pressure;*

*the oscillatory air flow generator comprising:*

*an air chamber;*

*a reciprocating diaphragm operably connected with the air chamber, the reciprocating diaphragm comprising a seal extending from the outer periphery of the reciprocating diaphragm to a wall of the air chamber; and*

*a first motor operably connected with the reciprocating diaphragm;*

*wherein the first motor has a shaft mechanically connected to the reciprocating diaphragm;*

*wherein rotation of the shaft reciprocates the reciprocating diaphragm in a cycle;*

*wherein each cycle of the reciprocating diaphragm displaces a fixed volume of air;*

*wherein the reciprocating diaphragm causes pressure changes inside the air chamber in comparison to ambient pressure;*

*wherein a majority of the fixed volume of air is moved into and out of the bladder during each cycle;*

*the positive air flow generator operably connected with the oscillatory air flow generator;*

*a frequency-compensation feedback system operably connected with the generator, wherein the frequency-compensation feedback system maintains an oscillation frequency at a predetermined value between about 5 Hz to about 25 Hz;*

*wherein the generator dynamically adjusts and controls the positive pressure to allow repeated inhalation and expiration of the person;*

*wherein the generator dynamically adjusts and controls the positive pressure to maintain the positive pressure at a predetermined value irrespective of the repeated inhalation and expiration of the person;*

*a vest comprising a bladder, the vest for placement around a torso of the person, the bladder positioned such that expansions and contractions of the bladder occur generally adjacent to torso of the person;*

*at least one tube operably connecting the bladder to the generator;*

*wherein the bladder causes oscillatory compression of the torso of the person;*

*wherein mucus from lungs of the person is loosened and expulsion of the mucus is assisted; and*

*wherein treatment is initiated by placing the vest around the torso of the person and selecting operating parameters on the control panel without further interaction required by the person with the apparatus during treatment.*

*90. An apparatus for generating oscillatory air pulses in a bladder positioned about a person, comprising:*

*a generator comprising an oscillatory air flow generator and a positive air flow generator, the generator providing a positive pressure and an oscillatory pressure;*

*the oscillatory air flow generator comprising:*

*an air chamber;*

*a reciprocating diaphragm operably connected with the air chamber; and*

*a first motor operably connected with the reciprocating diaphragm;*

*the positive air flow generator operably connected with the oscillatory air flow generator;*

*wherein the oscillatory pressure has an oscillation frequency, wherein the generator controls the oscillation frequency; and*

*wherein the generator maintains the positive pressure at a predetermined value irrespective of the repeated inhalation and expiration of the person.*

*91. The apparatus of claim 90 further comprising a frequency-compensation feedback system operably connected with the generator, wherein the frequency-compensation feedback system maintains the oscillation frequency at the predetermined value.*

*92. The apparatus of claim 90 wherein the generator maintains the oscillation frequency at a predetermined value.*

*93. The apparatus of claim 92 wherein the generator detects the oscillation frequency, compares the oscillation frequency to the predetermined value, and adjusts the oscillation frequency to the predetermined value.*

*94. The apparatus of claim 93 wherein the generator detects the oscillation frequency by detecting the oscillatory pressure.*

*95. The apparatus of claim 93 wherein the generator detects the oscillation frequency by detecting a motor speed.*

*96. The apparatus of claim 93 wherein the generator adjusts the oscillation frequency by changing a motor speed.*

*97. The apparatus of claim 91 wherein the generator maintains the oscillation frequency at a predetermined value irrespective of the repeated inhalation and expiration of the person.*

*98. The apparatus of claim 90 wherein the first motor maintains a constant speed irrespective of the repeated inhalation and expiration of the person.*

*99. The apparatus of claim 90 wherein the generator dynamically adjusts and controls the positive pressure to allow repeated inhalation and expiration of the person; and*

*wherein the generator dynamically adjusts and controls the positive pressure to maintain the positive pressure at a predetermined value irrespective of the repeated inhalation and expiration of the person.*

*100. A method for generating oscillatory air pulses in a bladder positioned about a person, comprising:*

*providing a generator comprising:*

*an air chamber;*

*a reciprocating diaphragm operably connected with the air chamber; and*

*a first motor operably connected with the reciprocating diaphragm;*

*generating an oscillatory air pressure and a positive air pressure with the generator, the oscillatory air pressure having an oscillation frequency;*

*maintaining the oscillation frequency with the generator to a first predetermined value;*

*maintaining the positive air pressure with the generator to allow repeated inhalation and expiration of the person; and*

*maintaining the positive air pressure with the generator to a second predetermined value irrespective of the repeated inhalation and expiration of the person.*

*101. The method of claim 100 further comprising dynamically adjusting the oscillation frequency with the generator to the first predetermined value.*

*102. The method of claim 100 further comprising dynamically adjusting the positive air pressure with the generator to allow repeated inhalation and expiration of the person.*

*103. The method of claim 100 further comprising dynamically adjusting the positive air pressure with the generator to*

*the second predetermined value irrespective of the repeated inhalation and expiration of the person.*

*104. The method of claim 100 wherein maintaining the oscillation frequency with the generator to the first predetermined value comprises detecting the oscillation frequency and adjusting the oscillation frequency to approximately equal the first predetermined value.*

*105. The method of claim 104 wherein detecting the oscillation frequency comprises detecting the oscillatory air pressure.*

*106. The method of claim 100 wherein maintaining the positive air pressure with the generator to the second predetermined value irrespective of the repeated inhalation and expiration of the person comprises detecting the positive air pressure and adjusting the positive air pressure to approximately equal the second predetermined value.*

*107. The method of claim 100 further comprising selectively adjusting the first predetermined value.*

*108. The method of claim 100 further comprising selectively adjusting the second predetermined value.*

*109. The method of claim 100 further comprising selecting operating parameters with a control panel.*

*110. The method of claim 100 further comprising:*

*providing the first motor with a shaft mechanically connected to the reciprocating diaphragm;*

*rotating the shaft;*

*reciprocating the reciprocating diaphragm in a cycle; and*

*displacing a fixed volume of air each cycle.*

*111. The method of claim 110 further comprising:*

*changing an air pressure inside the air chamber in comparison to ambient pressure, and*

*moving a majority of the fixed volume of air into and out of the bladder during each cycle.*

*112. The method of claim 111 wherein the air pressure inside the chamber is changed less than or equal to 1 psi.*

*113. The method of claim 100 wherein maintaining the oscillation frequency with the generator to a first predetermined value comprises maintaining the oscillation frequency at a predetermined value between about 5 Hz to about 25 Hz.*

*114. The method of claim 100 further comprising:*

*providing a vest comprising a bladder, placing the vest around a torso of the person; and*

*positioning the bladder and the vest such that expansions and contractions of the bladder occur generally adjacent to the torso of the person.*

*115. The method of claim 114 further comprising causing oscillatory compression of the torso of the person with the bladder.*

*116. The method of claim 100 further comprising loosening and assisting the expulsion of mucus from a lung of the person.*

*117. The method of claim 100 further comprising:*

*placing a vest around a torso of the person; and*

*selecting operating parameters on a control panel without further interaction required by the person with the generator.*

*118. The method of claim 100 wherein the generator further comprises an oscillatory air flow generator and a positive air flow generator, the positive air flow generator operably connected with the oscillatory air flow generator.*

* * * * *